United States Patent
Yoshida (10) Patent No.: US 8,216,729 B2
(45) Date of Patent: Jul. 10, 2012

(54) FUEL CELL SYSTEM AND GAS LEAK DETERMINATION METHOD FOR FUEL CELL SYSTEM

(75) Inventor: Naohiro Yoshida, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1271 days.

(21) Appl. No.: 11/660,810

(22) PCT Filed: Sep. 15, 2005

(86) PCT No.: PCT/JP2005/017438
§ 371 (c)(1), (2), (4) Date: Feb. 22, 2007

(87) PCT Pub. No.: WO2006/030969
PCT Pub. Date: Mar. 23, 2006

(65) Prior Publication Data
US 2007/0207355 A1    Sep. 6, 2007

(30) Foreign Application Priority Data

Sep. 16, 2004  (JP) ................. 2004-269683

(51) Int. Cl.
*H01M 8/04*        (2006.01)
(52) U.S. Cl. ........ 429/428; 429/410; 429/415; 429/429; 429/432; 429/444
(58) Field of Classification Search ............ 429/410, 429/415, 428, 429, 432
See application file for complete search history.

(56) References Cited

U.S. PATENT DOCUMENTS

| 2003/0077488 A1 | 4/2003 | Yamamoto et al. |
| 2004/0099048 A1* | 5/2004 | Miura et al. ............ 73/49.2 |
| 2005/0003245 A1 | 1/2005 | Mattejat et al. |

FOREIGN PATENT DOCUMENTS

| DE | 196 49 434 C1 | 1/1998 |
| DE | 100 60 626 A1 | 6/2002 |
| EP | 1 279 940 A2 | 1/2003 |
| JP | 08-329965 | 12/1996 |
| JP | 2000-274311 | 10/2000 |
| JP | 2002-56864 | 2/2002 |
| JP | 2003-132915 | 5/2003 |
| JP | 2003-148252 | 5/2003 |
| JP | 2003-308866 | 10/2003 |
| JP | 2003-308868 | 10/2003 |
| JP | 2004-111167 | 4/2004 |
| JP | 2004-158200 | 6/2004 |
| JP | 2004-253259 | 9/2004 |

\* cited by examiner

*Primary Examiner* — Patrick Ryan
*Assistant Examiner* — Ladan Mohaddes
(74) *Attorney, Agent, or Firm* — Oliff & Berridge, PLC (57) ABSTRACT

A fuel cell system (10) of the present invention comprises determination means (50) for consuming a fuel gas present at a gas leak detection portion of a fuel gas supply system (31, 32) through the power generation of a fuel cell (20), and performing a gas leak determination on the basis of a pressure decrease margin of the fuel gas present at the gas leak detection portion, and comprises discharge means (H51) for reducing the pressure at the gas leak detection portion by purging the fuel gas present at the gas leak detection portion to the outside of the fuel gas supply system (31, 32). By not only consuming the fuel gas present at the gas leak detection portion through power generation, but also purging the fuel gas to the outside of the fuel gas supply system, the pressure at the gas leak detection portion can be brought close to a target pressure within a short time period, and the gas leak determination can be performed in a short period of time and with a high level of precision.

12 Claims, 11 Drawing Sheets

FUEL CELL SYSTEM AND GAS LEAK DETERMINATION METHOD FOR FUEL CELL SYSTEM

BACKGROUND

The present invention relates to a fuel cell system and a gas leak determination method for the fuel cell system, and more particularly to an improved technique for determining a gas leak in a fuel gas supply system in a short period of time and with a high level of precision.

A fuel cell system which is capable of directly extracting chemical energy generated by an oxidation reduction reaction between a fuel gas and an oxidizing gas as electric energy is used as a power generation system in a fuel cell vehicle. In this type of fuel cell system, various shutoff valves (for example, a high-pressure hydrogen tank valve, a hydrogen supply valve, an FC stack inlet valve, an FC stack outlet valve, a purge valve, and so on) are disposed in a fuel gas supply passage for supplying fuel gas from a hydrogen supply source to a fuel cell. As a method of diagnosing a defect in these various shutoff valves, Japanese Unexamined Patent Application Publication 2000-274311, for example, proposes a technique for determining a valve defect in which a shutoff valve disposed in a fuel gas supply passage of a vehicle is closed to create a closed space in the fuel gas supply passage, and a valve defect is determined when a pressure decrease rate relative to the elapse of time in the closed space falls below a pressure decrease rate threshold. However, the pressure decrease speed on the downstream side of the shutoff valve varies according to the operating conditions of the vehicle, or in other words the fuel consumption rate. Hence, when the fuel consumption rate falls in accordance with the operating conditions of the vehicle, a large amount of time is required for the pressure to decrease on the downstream side of the shutoff valve, and therefore a defect cannot be diagnosed speedily. In consideration of this background art, Japanese Unexamined Patent Application Publication 2003-308868 proposes a technique for reducing the pressure on the downstream side of a shutoff valve within a short time period when diagnosing a defect in the shutoff valve by increasing the consumed power of a power consumption section (a motor or the like) to increase the fuel consumption amount of the fuel cell.

SUMMARY

However, when the fuel consumption-amount is increased simply by increasing the consumed power of the power consumption section, the impurity concentration of the hydrogen off-gas that is recirculated through the fuel cell increases, and therefore reductions in the cell voltage cannot be avoided. When the cell voltage falls, the fuel consumption amount falls below a target value, and hence a large amount of time is required to reduce the pressure on the downstream side of the shutoff valve. Moreover, with the technique described in Japanese Unexamined Patent Application Publication 2003-308868, the amount of energy conserved by energy conserving means must be reduced in advance, prior to defect diagnosis, so that the power obtained in the defect diagnosis can be stored in the energy conserving means, and as a result, defect diagnosis cannot be performed speedily.

An object of the present invention is to solve these problems by providing a fuel cell system and a gas leak determination method for the fuel cell system with which a gas leak in a fuel gas supply system can be determined in a short period of time and with a high level of precision.

To solve the problems described above, a fuel cell system of the present invention comprises determination means for consuming a fuel gas present at a gas leak detection portion of a fuel gas supply system at an anode of a fuel cell, and performing a gas leak determination on the basis of a pressure variation state of the fuel gas present at the gas leak detection portion. The fuel cell system comprises discharge means for reducing the pressure at the gas leak detection portion by purging the fuel gas present at the gas leak detection portion to the outside of the fuel gas supply system. Here, the term "pressure variation state" denotes a physical quantity relating to pressure variation, preferably a pressure reduction margin or the like, for example. By purging the fuel gas to the outside of a fuel gas supply passage in addition to consuming the fuel gas present at the gas leak detection portion at the anode of the fuel cell, the pressure at the gas leak detection portion can be brought close to a target pressure in a short period of time, and hence the gas leak determination can be performed in a short time period and with a high level of precision. Moreover, by purging the fuel gas, increases in the impurity concentration of the fuel gas can be suppressed, and as a result, decreases in cell voltage can be suppressed.

When the pressure at the gas leak detection portion falls below the target pressure due to purging of the fuel gas, the discharge means preferably restrict purging of the fuel gas. Here, the term "restrict" means to reduce the fuel gas purge amount to a small amount or to prohibit fuel gas purging. In so doing, the pressure at the gas leak detection portion can be brought close to the target pressure.

Further, the discharge means may vary the purge amount of the fuel gas in accordance with the consumption amount of the fuel gas present at the gas leak detection portion. For example, by increasing the fuel gas purge amount when a large amount of fuel gas is present at the gas leak detection portion, the pressure at the gas leak detection portion can be brought close to the target pressure speedily. When the amount of fuel gas present at the gas leak detection portion is small, on the other hand, the fuel gas purge amount is small.

Further, the fuel cell system of the present invention preferably further comprises control means for varying a generated current of the fuel cell in accordance with the consumption amount of the fuel gas present at the gas leak detection portion. For example, by increasing the amount of fuel gas consumed by power generation when a large amount of fuel gas is present at the gas leak detection portion, the pressure at the gas leak detection portion can be brought close to the target pressure rapidly. When the amount of fuel gas present at the gas leak detection portion is small, on the other hand, the amount of fuel gas consumed by power generation is small.

Further, the fuel cell system of the present invention preferably further comprises storage means for storing power generated by the fuel cell, and the discharge means preferably vary the fuel gas purge amount in accordance with a charge amount of the storage means. For example, when the charge amount of the storage means is small, a large amount of the power obtained through consumption of the fuel gas present at the gas leak detection portion can be charged, and therefore the fuel gas purge amount is reduced. On the other hand, when the charge amount of the storage means is large, the power obtained through consumption of the fuel gas present at the gas leak detection portion cannot be charged, and therefore the fuel gas purge amount should be increased.

Further, the fuel cell system of the present invention preferably further comprises oxidizing gas supply means for supplying an oxidizing gas to a cathode of the fuel cell, and a diluter for mixing and diluting a cathode off-gas discharged from the fuel cell and the fuel gas purged by the discharge means, and the oxidizing gas supply means preferably modify an oxidizing gas supply amount in accordance with the purge amount of the fuel gas purged from the discharge means. In so doing, the discharged fuel gas concentration can be reduced.

Further, the fuel cell system of the present invention preferably further comprises a fuel gas sensor for detecting a fuel gas leak, and the fuel gas purge amount purged each time from the discharge means is preferably within a leak detection threshold range of the fuel gas sensor. Thus, erroneous determinations by the fuel gas sensor can be avoided.

Further, in the fuel cell system of the present invention, the gas leak detection portion is preferably a substantially sealed space formed by closing a valve disposed in the fuel gas supply system, and the determination means preferably perform the gas leak determination after the valve is closed and a time required to stabilize the pressure in the substantially sealed space has elapsed. Thus, the gas leak determination can be performed accurately.

Further, in the fuel cell system of the present invention, the discharge means may be a purge valve disposed in an anode off-gas flow passage for discharging hydrogen off-gas discharged from the fuel cell to the outside of the system.

In a gas leak determination method for a fuel cell system of the present invention, a fuel gas present at a gas leak detection portion of a fuel gas supply system is consumed at an anode of a fuel cell, and a gas leak determination is performed on the basis of a pressure variation state of the fuel gas present at the gas leak detection portion. The gas leak determination method comprises the step of reducing the pressure at the gas leak detection portion by purging the fuel gas present at the gas leak detection portion to the outside of the fuel gas supply system.

In the gas leak determination method of the present invention, when the pressure at the gas leak detection portion falls below a target pressure due to purging of the fuel gas, purging of the fuel gas may be restricted.

Further, in the gas leak determination method of the present invention, the purge amount of the fuel gas may be varied in accordance with the consumption amount of the fuel gas present at the gas leak detection portion.

DETAILED DESCRIPTION

Figure 1:
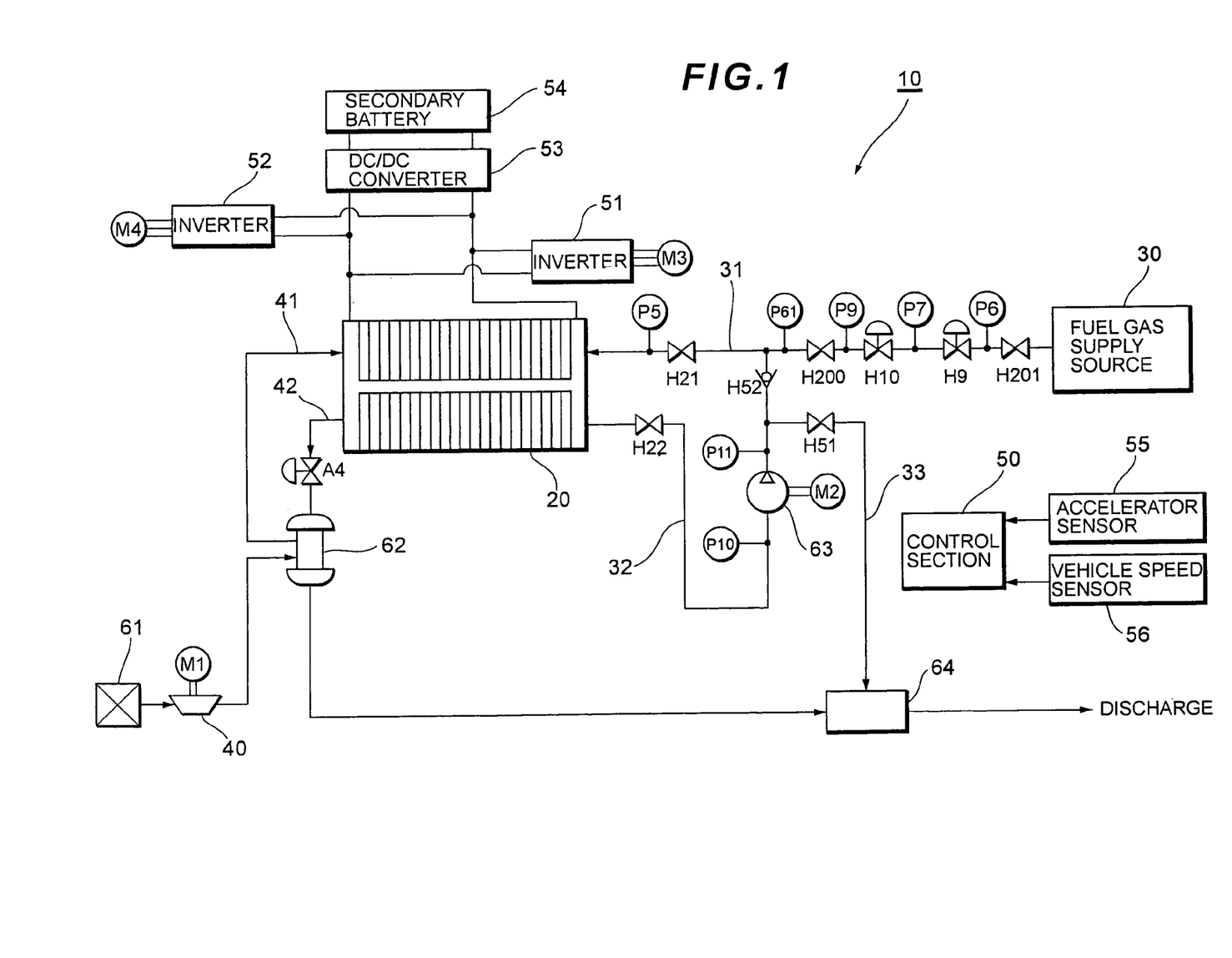
FIG. 1 is a block diagram of a fuel cell system according to an embodiment.

FIG. 1 shows the schematic constitution of a fuel cell system according to this embodiment. Here, an example in which a fuel cell system 10 is used as a vehicle-installed power generating system of a fuel cell vehicle (FCEV) is shown, but the fuel cell system 10 may also be used as a stationary fuel cell system. A fuel cell (cell stack) 20 has a stack structure formed by laminating a plurality of single cells in series, and is constituted by polymer electrolyte fuel cells or the like, for example.

A fuel gas supply source 30, a fuel gas supply passage 31, and a fuel gas recirculation passage 32 are disposed in a fuel gas supply system (fuel gas piping system) of the fuel cell 20. Here, the fuel gas supply system is a comprehensive term encompassing gas pipes, valves, and so on disposed on a path for supplying fuel gas from the fuel gas supply source 30 to the fuel cell 20, and includes the fuel gas supply source 30, the fuel gas supply passage 31 which connects the fuel gas supply source 30 to the fuel cell 20, and an open/close valve, a regulator, and so on provided in the fuel gas supply passage 31. When a system for recirculating fuel gas discharged from the fuel cell 20 to the fuel gas supply passage 31 is employed, the fuel gas supply system may also include the fuel gas recirculation passage 32. The fuel gas supply source 30 is constituted by a hydrogen storage source such as a high-pressure hydrogen tank or a hydrogen storage tank, a reformer for reforming a reform material into hydrogen-rich gas, or another source, for example. The fuel gas supply passage 31 is a gas flow passage for leading fuel gas discharged from the fuel gas supply source 30 to an anode of the fuel cell 20, and a tank valve H201, a high pressure regulator H9, a low pressure regulator H10, a hydrogen supply valve H200, and an FC stack inlet valve H21 are disposed in this gas flow passage in sequence from the upstream side to the downstream side. Fuel gas compressed to a high pressure is decompressed to an intermediate pressure by the high pressure regulator H9 and decompressed further to a low pressure (normal operating pressure) by the low pressure regulator H10. The fuel gas recirculation passage 32 is a recirculation gas flow passage for recirculating unreacted fuel gas to the fuel cell 20, and an FC stack outlet valve H22, a hydrogen pump 63, and a check valve H52 are disposed in this gas flow passage in sequence from the upstream side to the downstream side. Low-pressure unreacted fuel gas discharged from the fuel cell 20 is pressurized to an appropriate level by the hydrogen pump 63 and led to the fuel gas supply passage 31. The check valve H52 suppresses fuel gas backflow from the fuel gas supply passage 31 to the fuel gas recirculation passage 32. An anode off-gas flow passage 33 is a gas flow passage for discharging hydrogen off-gas discharged from the fuel cell 20 to the outside of the system, and a purge valve (discharge means) H51 is disposed in this gas flow passage.

The tank valve H201, hydrogen supply valve H200, FC stack inlet valve H21, FC stack outlet valve H22, and purge valve H51 are shut valves for supplying, or shutting off the supply of, fuel gas to the gas flow passages 31 to 33 or the fuel cell 20, and are constituted by solenoid valves, for example. Favorable examples of this type of solenoid valve include an on-off valve and a linear valve in which the valve opening can be regulated linearly through PWM control.

An air compressor (oxidizing gas supply source) 40, an oxidizing gas supply passage 41, and a cathode off-gas flow passage 42 are provided in an oxidizing gas supply system (oxidizing gas piping system) of the fuel cell 20. In this embodiment, oxidizing gas supply means are constituted by at least the air compressor 40 and the oxidizing gas supply passage 41. The air compressor 40 compresses air taken in from outside air through an air filter 61, and supplies the resulting compressed air to the cathode of the fuel cell 20 as oxidizing gas. Oxygen off-gas, after contributing to a cell reaction in the fuel cell 20, flows through the cathode off-gas flow passage 42 and is discharged to the outside of the system. The oxygen off-gas contains moisture generated by the cell reaction in the fuel cell 20 and is therefore in a state of high humidity. A humidification module 62 performs moisture exchange between the low-humidity oxidizing gas flowing through the oxidizing gas supply passage 41 and the high-humidity oxygen off-gas flowing through the cathode off-gas flow passage 42, whereby the oxidizing gas supplied to the fuel cell 20 is humidified to an appropriate degree. The back pressure of the oxidizing gas supplied to the fuel cell 20 is regulated by a pressure regulating valve A4 disposed near a cathode outlet of the cathode off-gas flow passage 42. The downstream side of the cathode off-gas flow passage 42 communicates with a diluter 64 such that the oxygen off-gas is supplied to the diluter 64. The diluter 64 also communicates with the downstream side of the anode off-gas flow passage 33, and therefore the hydrogen off-gas is mixed with and diluted by the oxygen off-gas and then discharged to the outside of the system.

A part of the direct current power generated by the fuel cell 20 is reduced in voltage by a DC/DC converter 53 and used to charge a secondary battery (storage means) 54. The secondary battery 54 serves as a storage source of regeneration energy generated during braking of the vehicle, and a buffer for energy generated during load variation accompanying acceleration or deceleration of the vehicle, and is constituted by a nickel-cadmium storage battery, a nickel-hydrogen storage battery, a lithium secondary battery, or similar. A traction inverter 51 and an auxiliary inverter 52 convert direct current power supplied by one or both of the fuel cell 20 and the secondary battery 54 into alternating current power, and supply the alternating current power to a traction motor M3 and an auxiliary motor M4, respectively. The auxiliary motor M4 is the collective designation for a motor M2 for driving the hydrogen recirculation pump 63, to be described below, a motor M1 for driving the air compressor 40, and so on.

A control section 50 determines a required system power (the sum total of a vehicle traveling power and an auxiliary power) on the basis of an accelerator opening detected by an accelerator sensor 55, a vehicle speed detected by a vehicle speed sensor 56, and so on, and controls the fuel cell system 10 such that the output power of the fuel cell 20 matches a target power. More specifically, the control section 50 adjusts the oxidizing gas supply amount by adjusting the rotation speed of the motor M1 for driving the air compressor 40, and adjusts the fuel gas supply amount by adjusting the rotation speed of the motor M2 for driving the hydrogen pump 63. Further, the control section 50 adjusts the operating point (output voltage, output current) of the fuel cell 20 by controlling the DC/DC converter 53 such that the output power of the fuel cell 20 matches the target power.

Note that the fuel gas supply system is constituted by four sections, namely a high pressure section (the section extending from the tank valve H201 to the hydrogen supply valve H200), a low pressure section (the section extending from the hydrogen supply valve H200 to the FC stack inlet valve H21), an FC section (the section extending from the stack inlet valve H21 to the FC stack outlet valve H22), and a recirculation section (the section extending from the FC stack outlet valve H22 to the check valve H52), and pressure sensors P6, P7, P9, P61, P5, P10, P11 for detecting the pressure of the fuel gas are disposed in each section. More specifically, the pressure sensor P6 detects a fuel gas supply pressure in the fuel gas supply source 30. The pressure sensor P7 detects a secondary pressure of the high pressure regulator H9. The pressure sensor P9 detects a secondary pressure of the low pressure regulator H10. The pressure sensor P61 detects the pressure in the low pressure section of the fuel gas supply passage 31. The pressure sensor P5 detects the pressure at the stack inlet. The pressure sensor P10 detects the pressure on an inlet port side (upstream side) of the hydrogen recirculation pump 63. The pressure sensor P11 detects the pressure on an outlet port side (downstream side) of the hydrogen recirculation pump 63.

In this embodiment, a gas leak in the fuel gas supply system is determined in each section (the high pressure section, low pressure section, FC section, and recirculation section). In other words, each section serves as a gas leak detection portion. The control section 50 functions as determination means for performing a gas leak determination (S102, S106, S108), as will be described below, and also functions as control means for controlling the generated current of the fuel cell in order to consume the fuel gas present at the gas leak detection portion. The volume of each gas leak detection portion is different, and therefore the amount of fuel gas present thereat is also different. The control section 50 preferably controls the generated current of the fuel cell 20 in accordance with the volume (fuel gas amount) of the gas leak detection portion. For example, fuel gas consumption is controlled by increasing the value of the generated current when the volume of the gas leak detection portion is large, decreasing the value of the generated current when the volume of the gas leak detection portion is small, and so on. Further, the control section 50 preferably controls the amount of fuel gas purged from the purge valve H51 (the purge amount) in accordance with the volume of the gas leak detection portion. For example, control is performed to bring the pressure of the gas leak detection portion near to a target pressure by increasing the purge amount when the volume of the gas leak detection portion is large, decreasing the purge amount when the volume of the gas leak detection portion is small, and so on. Further, the control section 50 preferably controls the fuel gas purge amount in accordance with an SOC (State of Charge) of the secondary battery 54. For example, when the SOC of the secondary battery 54 is high, the generated power obtained by causing the fuel cell 20 to generate power so that the fuel gas is consumed cannot be charged to the secondary battery 54, and therefore the fuel gas purge amount is increased. Conversely, when the SOC of the secondary battery 54 is low, the generated power of the fuel cell 20 can be charged to the secondary battery 54, and therefore the fuel gas purge amount is reduced.

Note that when a fuel gas sensor (a hydrogen sensor, for example) for detecting a fuel gas leak is disposed in the fuel cell system 10, the fuel gas purge amount purged each time from the purge valve H51 is preferably within a leak detection threshold range (equal to or lower than a minimum concentration at which a gas leak can be detected by) of the fuel gas sensor. In so doing, erroneous determinations by the fuel gas sensor can be avoided.

Figure 2:
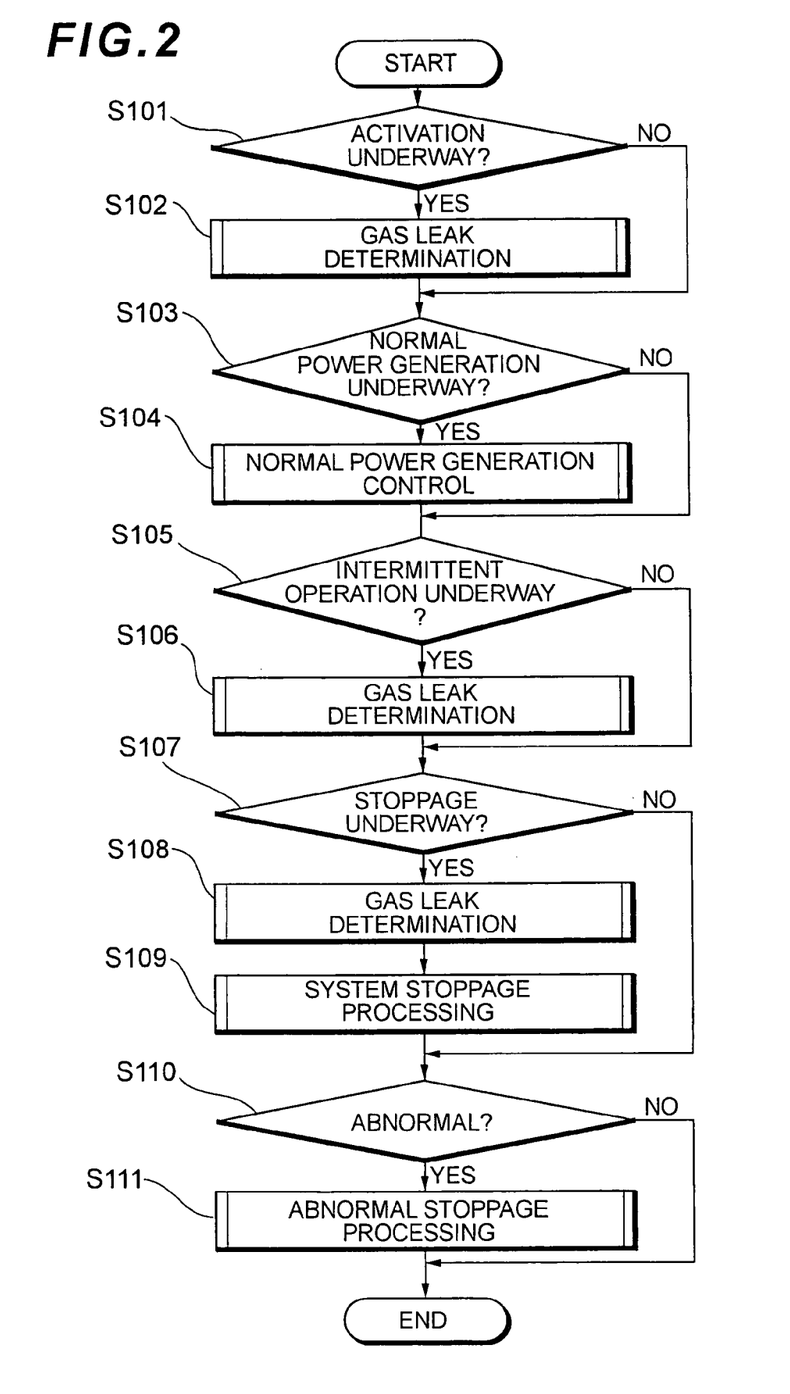
FIG. 2 is a main routine of system control.

FIG. 2 is a main routine illustrating system control executed by the control section 50. This system control will now be described in outline with reference to the drawing, whereupon various subroutines thereof will be described. When the fuel cell system 10 is activated (S101, YES), the control section 50 performs a gas leak determination in the fuel gas supply system (S102). When it is determined here that there is no gas leak and that power generation can be performed normally (S103; YES), normal power generation control is performed (S104). When a predetermined intermittent operation starting condition is satisfied during a normal operation (S105; YES), the control section 50 performs a gas leak determination in the fuel gas supply system (S106). An intermittent operation is an operating mode performed during a low load operation such as idling, low-speed traveling, or regenerative braking, in which power generation by the fuel cell 20 is halted temporarily and traveling is performed using power supplied by the secondary battery 54. When a system stoppage is performed (S107; YES), the control section 50 performs a gas leak determination in the fuel gas supply system (S108), and then performs system stoppage processing (S109). When a gas leak is detected (S110; YES), abnormal stoppage processing is performed (S111).

Next, each subroutine will be described in detail.

Figure 3:
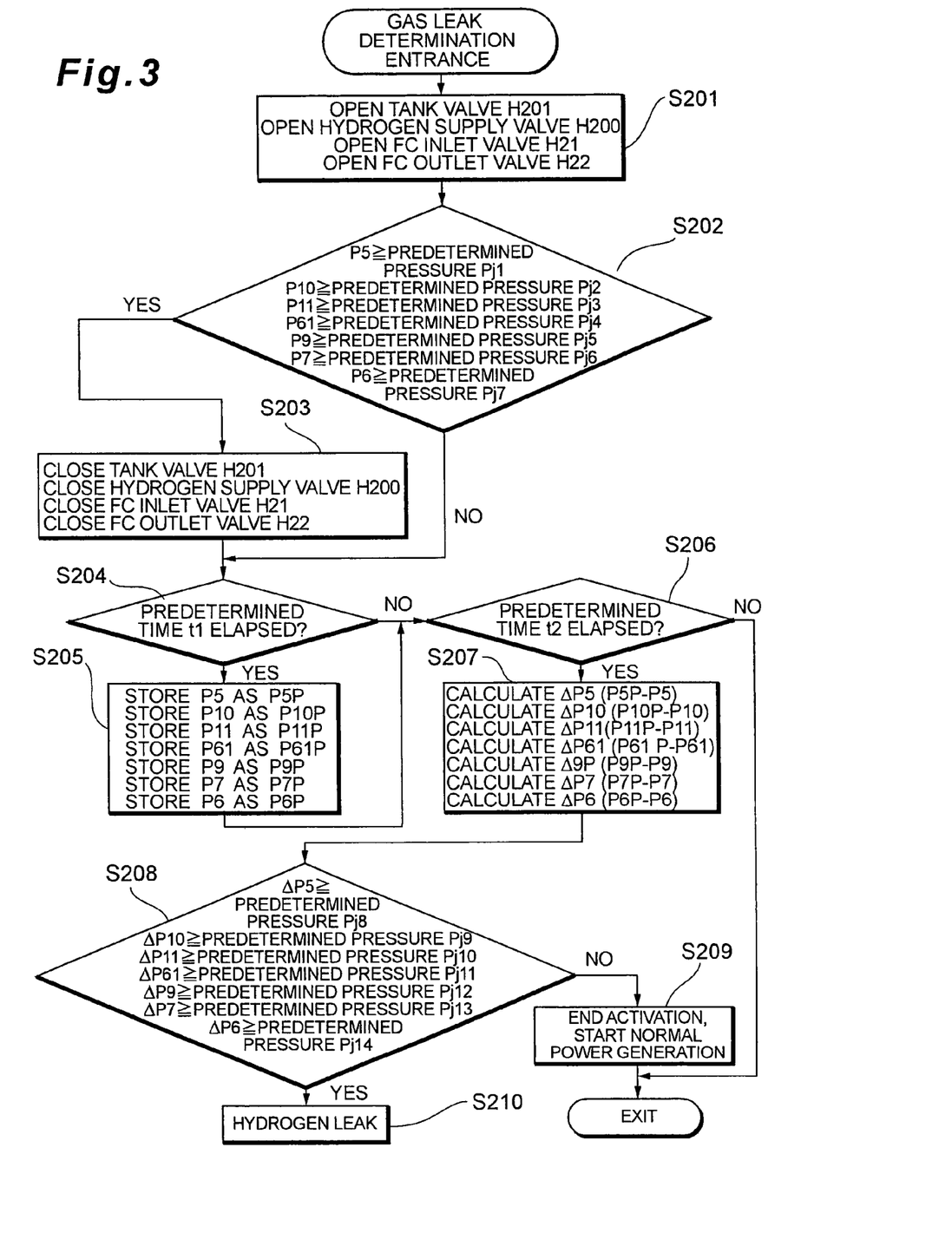
FIG. 3 is a gas leak determination processing routine performed during system activation.

FIG. 3 is a flowchart illustrating a gas leak determination processing routine (S102) performed during system activation. When this routine is called, the control section 50 opens the tank valve H201, hydrogen supply valve H200, FC stack inlet valve H21, and FC stack outlet valve H22 such that fuel gas is supplied to the fuel cell 20 through the fuel gas supply passage 31 (S201). Next, the control section 50 determines whether or not the pressure values of all of the pressure sensors P5 to P6 provided in the fuel gas supply system are equal to or greater than predetermined pressure values Pj1 to Pj7, respectively (S202). When all of the pressure sensors P5 to P6 have reached or exceeded the respective predetermined pressure values Pj1 to Pj7 and the pressure of the fuel gas supply passage 31 and fuel gas recirculation passage 32 has risen to a state in which a gas leak determination can be performed (S202; YES), the control section 50 closes the tank valve H201, hydrogen supply valve H200, FC stack inlet valve H21, and FC stack outlet valve H22 (S203) such that the fuel gas supply passage 31 and fuel gas recirculation passage 32 are sealed. When a predetermined time t1 from the sealed state elapses (S204), the control section 50 stores the pressure values of the pressure sensors P5 to P6 as P5P to P6P (S205). When a predetermined time t2 from the sealed state elapses (S206), the control section 50 calculates differential pressures ΔP5 to ΔP6 between the stored pressure values P5P to P6P and pressure values detected by the pressure sensors P5 to P6 after the predetermined time t2 has elapsed (S207). The differential pressures ΔP5 to ΔP6 determined here correspond to the pressure decrease over time (t2–t1). The control section 50 then determines whether or not the differential pressures ΔP5 to ΔP6 are equal to or greater than predetermined pressure values pj8 to Pj14, respectively (S208). When all of the differential pressures ΔP5 to ΔP6 are lower than the predetermined pressure values pj8 to Pj14 (S208; NO), it is assumed that there is no gas leak, and therefore system activation ends and normal power generation begins (S209). On the other hand, when any one of the differential pressures ΔP5 to ΔP6 is equal to or greater than the predetermined pressure values pj8 to Pj14 (S208; YES), the control section 50 determines that a gas leak has occurred (S210).

Figure 4:
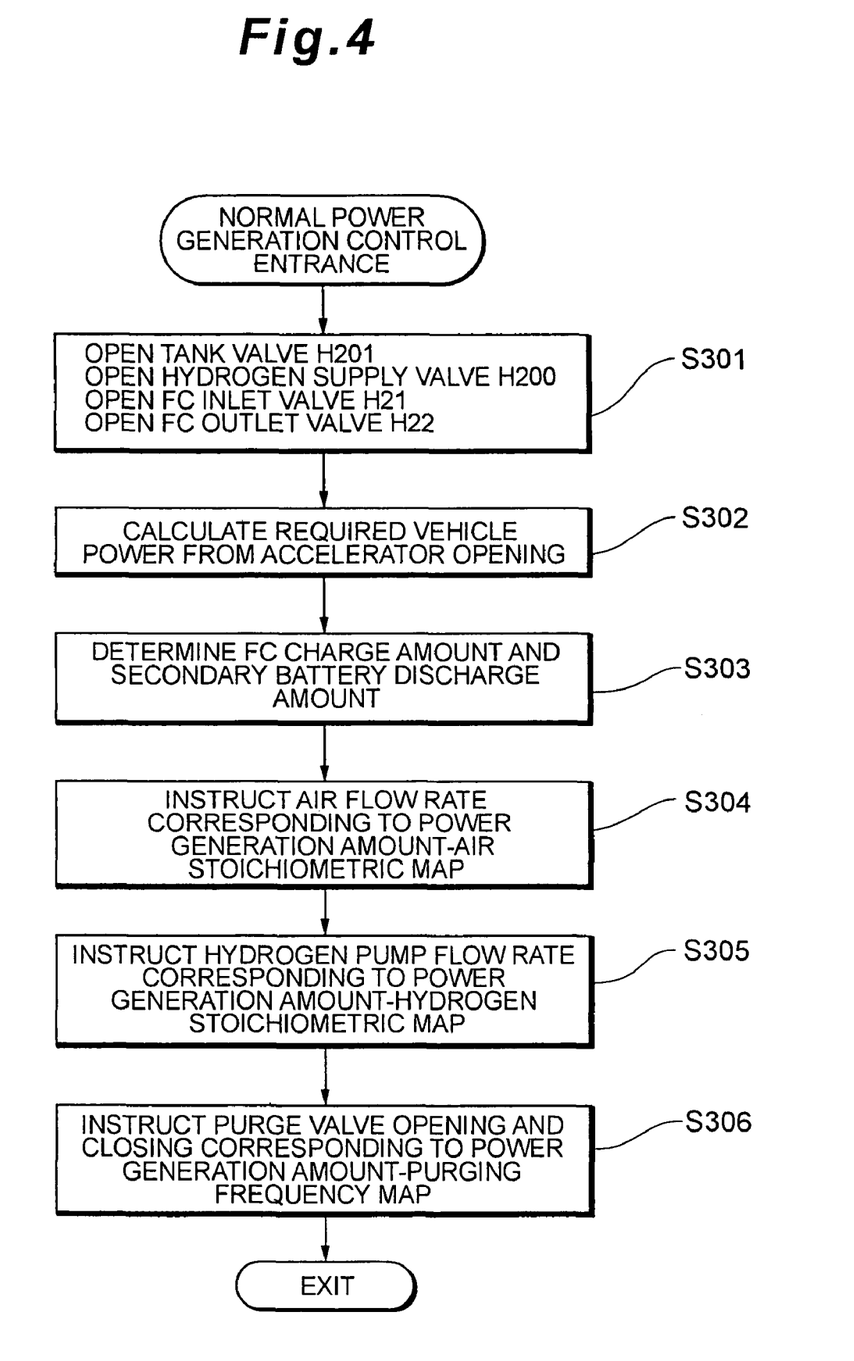
FIG. 4 is a normal power generation control routine.
Figure 5:
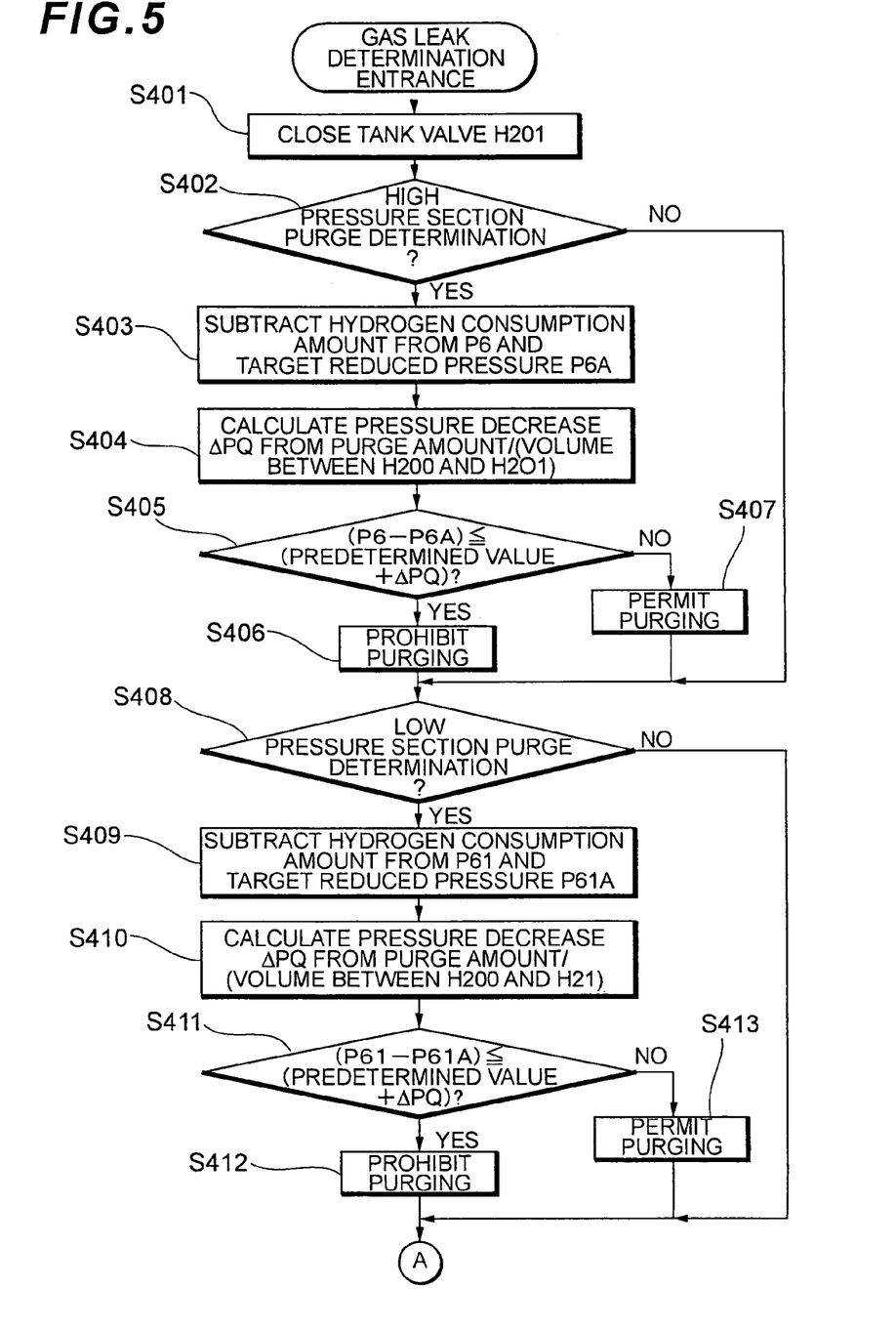
FIG. 5 is a gas leak determination processing routine.
Figure 6:
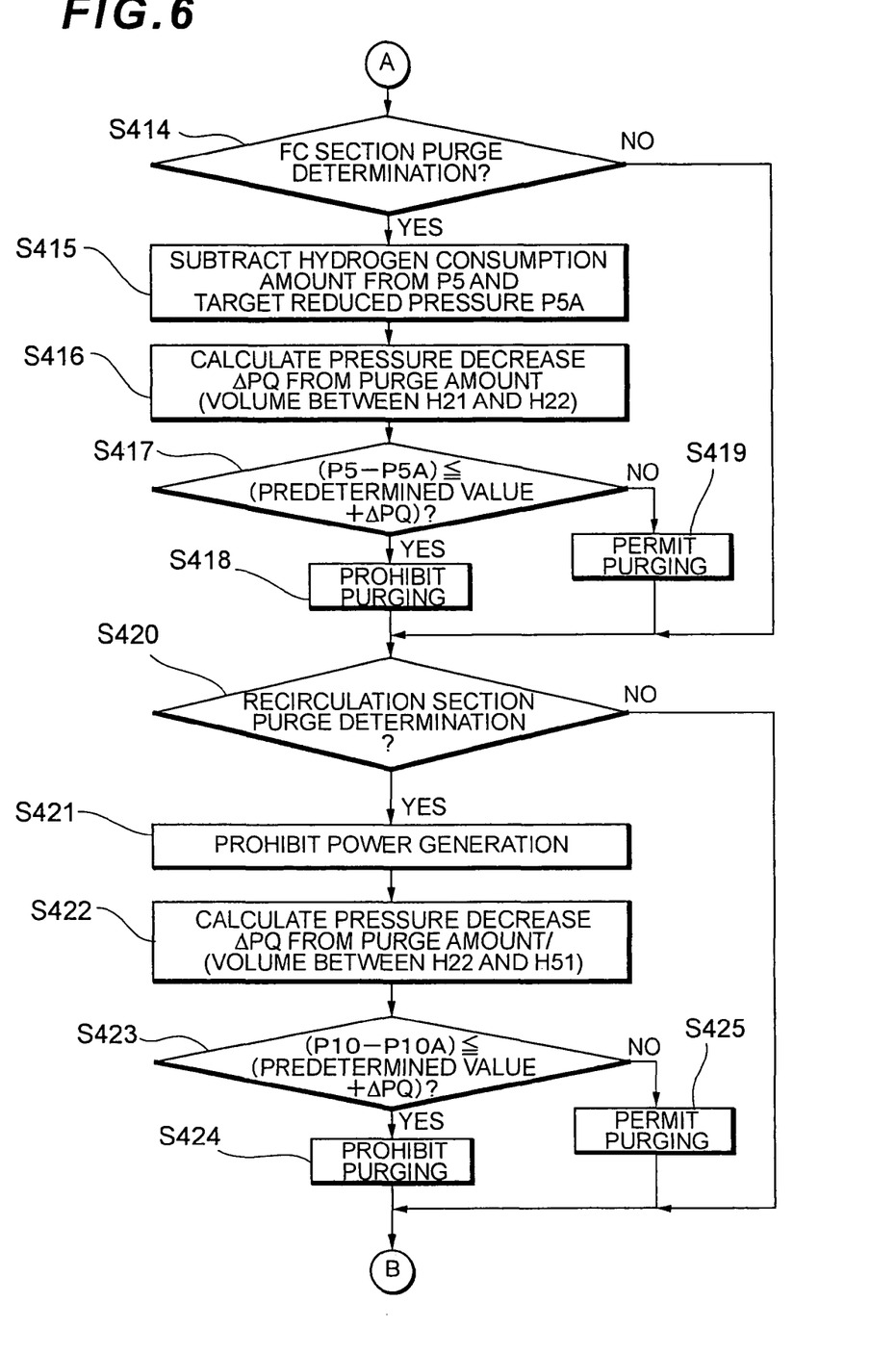
FIG. 6 is a gas leak determination processing routine.
Figure 7:
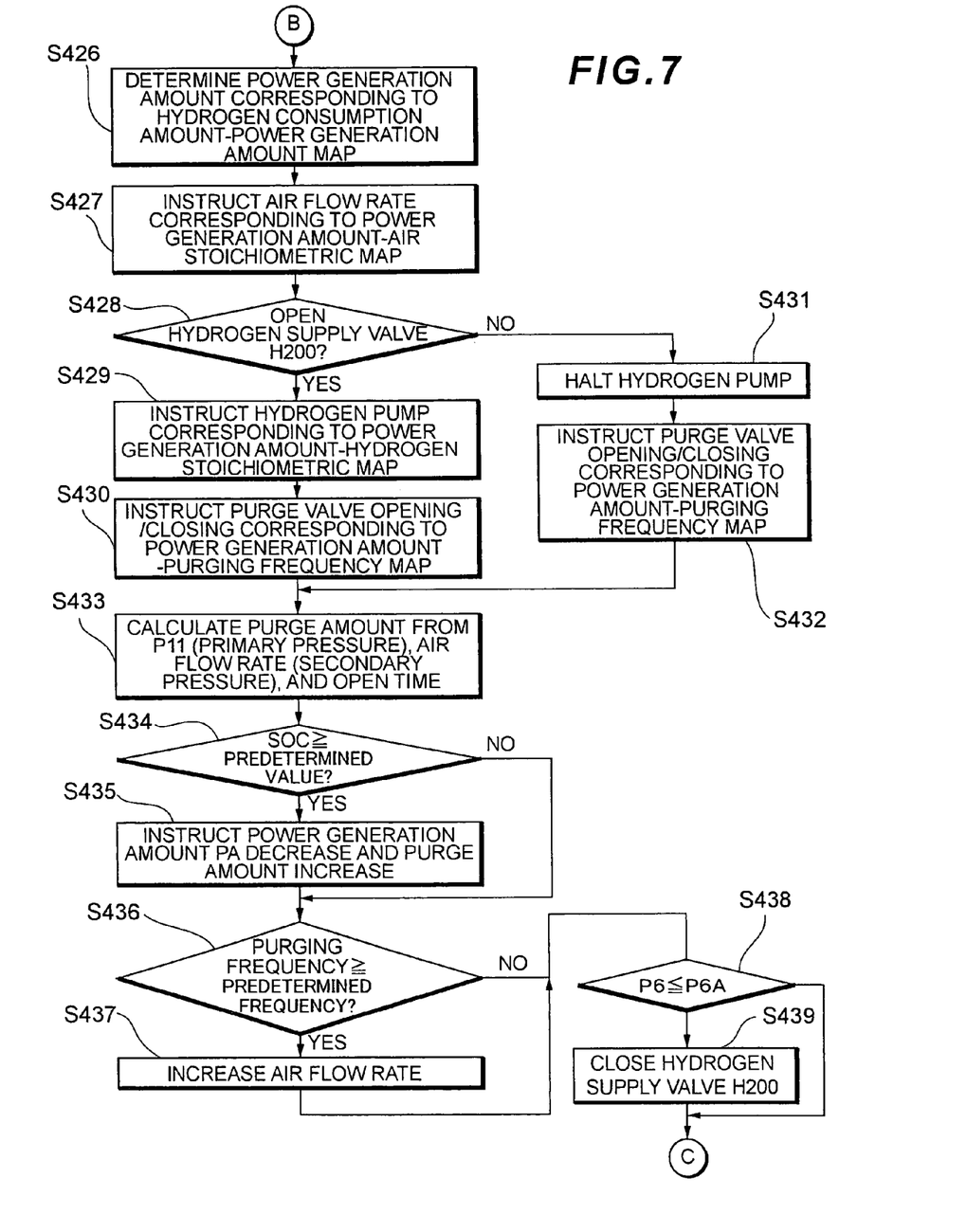
FIG. 7 is a gas leak determination processing routine.
Figure 8:
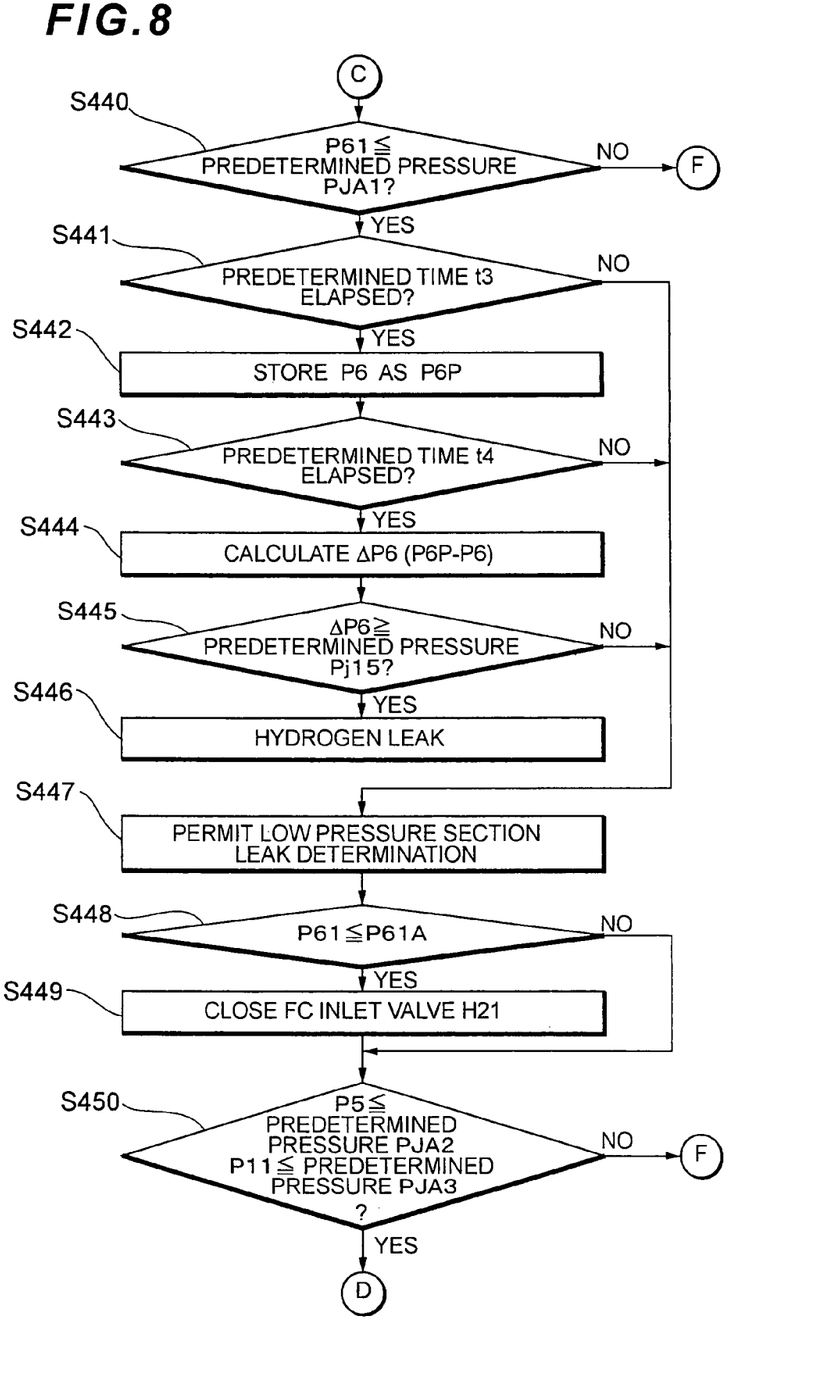
FIG. 8 is a gas leak determination processing routine.
Figure 9:
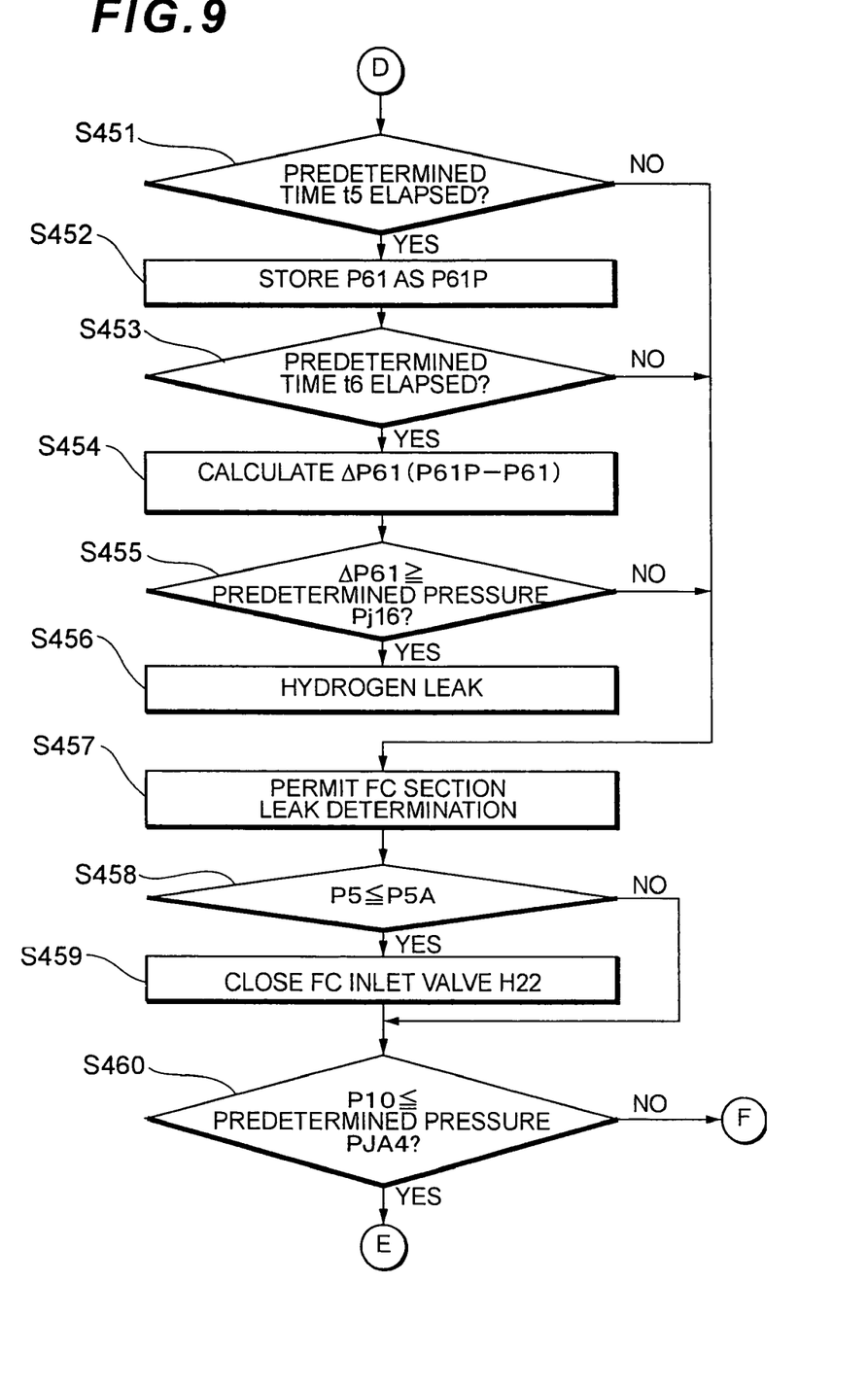
FIG. 9 is a gas leak determination processing routine.
Figure 10:
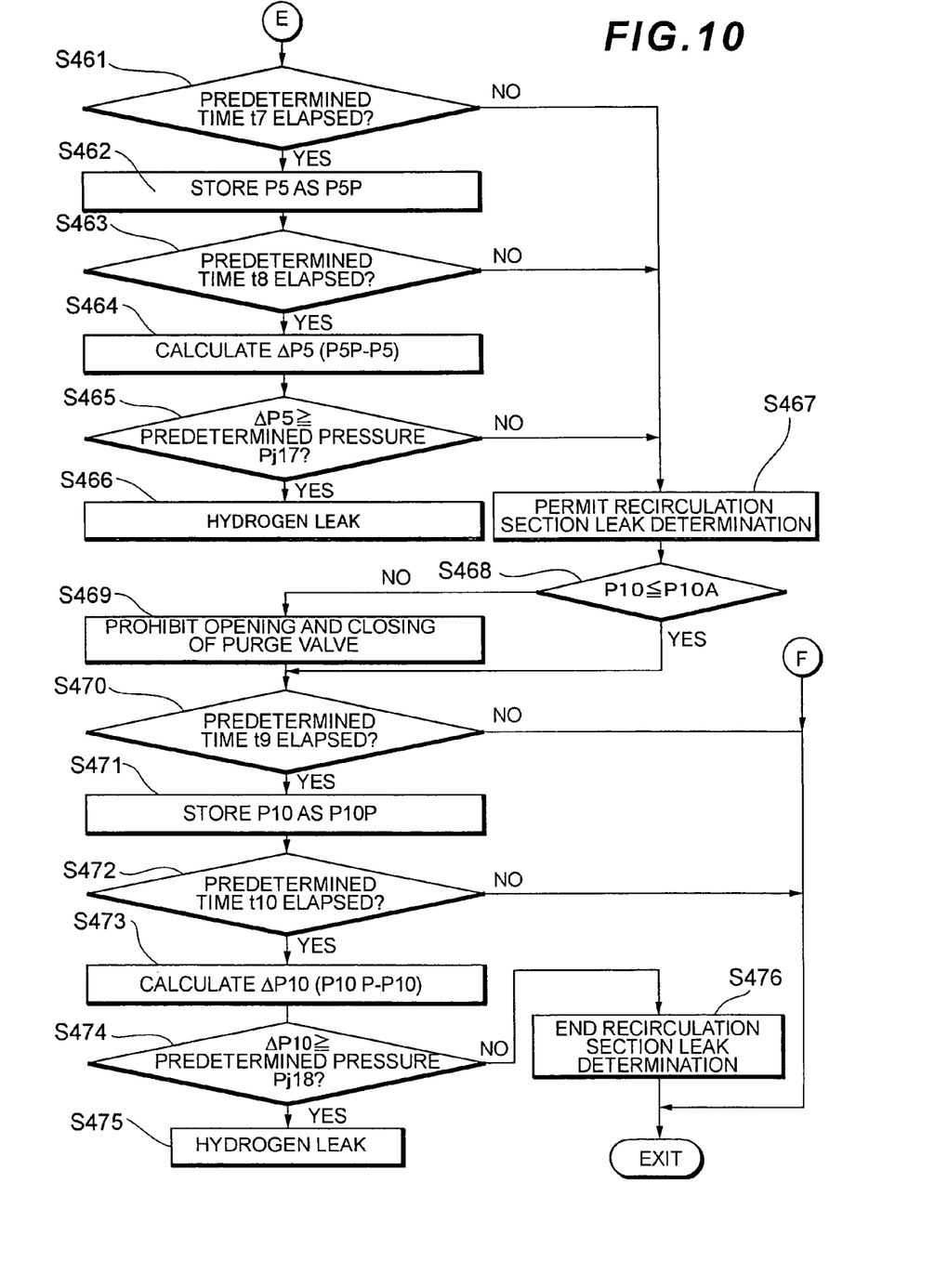
FIG. 10 is a gas leak determination processing routine.

FIG. 4 is a flowchart illustrating a power generation control routine (S104) performed during a normal operation. When this routine is called, the control section 50 opens the valves of the fuel gas supply system (tank valve H201, hydrogen supply valve H200, FC stack inlet valve H21, and FC stack outlet valve H22) (S301). Next, the control section 50 calculates the required vehicle power (required system power) on the basis of the accelerator opening, vehicle speed, and so on (S302), and then determines a ratio between the output power of the fuel cell 20 and the output power of the secondary battery 54 (S303). Referring to a fuel cell power generation amount-air stoichiometric map, the control section 50 controls the rotation speed of the motor M1 such that the oxidizing gas is supplied to the fuel cell 20 at a desired flow rate (S304). Further, referring to a fuel cell power generation amount-hydrogen stoichiometric map, the control section 50 controls the rotation speed of the motor M2 such that the fuel gas is supplied to the fuel cell 20 at a desired flow rate (S305). Next, referring to a fuel cell power generation amount-fuel gas purging frequency map, the control section 50 performs open/close control on the purge valve H51 (S306). Thereafter, the normal operation is executed continuously by executing this power generation control routine repeatedly at predetermined intervals.

FIGS. 5 through 10 are flowcharts illustrating a gas leak determination processing routine (S106, S108) performed during an intermittent operation or a system stoppage. When the routine is called, the control section 50 closes the tank valve H201 (S401), and performs a purge determination in the high pressure section (S402). A purge determination is performed to determine whether or not to purge the fuel gas. First, a required fuel gas consumption amount for matching the pressure in the high pressure section to a target pressure P6A of the high pressure section is calculated on the basis of a differential pressure between the pressure detected by the pressure sensor P6 and the target pressure P6A (S403). Next, a pressure decrease ΔPQ is calculated from a ratio between the purge amount purged each time by the purge valve H51 and the volume of the high pressure section (S404). If the fuel gas is purged when the differential pressure between the pressure in the high pressure section and the target pressure P6A is equal to or less than ΔPQ+a predetermined value (margin) (S405; YES), the pressure in the high pressure section falls below the target pressure P6A, and therefore purging is prohibited (S406). On the other hand, when the differential pressure between the pressure in the high pressure section and the target pressure P6A exceeds ΔPQ+the predetermined value (margin) (S405; NO), the pressure in the high pressure section does not fall below the target pressure P6A when the fuel gas is purged, and therefore purging is permitted (S407).

Next, a purge determination in the low pressure section is performed (S408). First, a required fuel gas consumption amount for matching the pressure in the low pressure section to a target pressure P61A of the high pressure section is calculated on the basis of a differential pressure between the pressure detected by the pressure sensor P61 and the target pressure P61A (S409). Next, the pressure decrease ΔPQ is calculated from a ratio between the purge amount purged each time by the purge valve H51 and the volume of the low pressure section (S410). If the fuel gas is purged when the differential pressure between the pressure in the low pressure section and the target pressure P61A is equal to or less than ΔPQ+a predetermined value (margin) (S411; YES), the pressure in the low pressure section falls below the target pressure P61A, and therefore purging is prohibited (S412). On the other hand, when the differential pressure between the pressure in the low pressure section and the target pressure P61A exceeds ΔPQ+the predetermined value (margin) (S411; NO), the pressure in the low pressure section does not fall below the target pressure P61A when the fuel gas is purged, and therefore purging is permitted (S413).

Next, a purge determination in the FC section is performed (S414). First, a required fuel gas consumption amount for matching the pressure in the FC section to a target pressure P5A of the high pressure section is calculated on the basis of a differential pressure between the pressure detected by the pressure sensor P5 and the target pressure P5A (S415). Next, the pressure decrease ΔPQ is calculated from a ratio between the purge amount purged each time by the purge valve H51 and the volume of the FC section (S416). If the fuel gas is purged when the differential pressure between the pressure in the FC section and the target pressure P5A is equal to or less than ΔPQ+a predetermined value (margin) (S417; YES), the pressure in the FC section falls below the target pressure P5A, and therefore purging is prohibited (S418). On the other hand, when the differential pressure between the pressure in the FC section and the target pressure P5A exceeds ΔPQ+the predetermined value (margin) (S417; NO), the pressure in the FC section does not fall below the target pressure P5A when the fuel gas is purged, and therefore purging is permitted (S419).

Next, a purge determination in the recirculation section is performed (S420). First, power generation is prohibited (S421). Next, the pressure decrease ΔPQ is calculated from a ratio between the purge amount purged each time by the purge valve H51 and the volume of the recirculation section (S422). If the fuel gas is purged when a differential pressure between the pressure in the recirculation section and a target pressure P10A is equal to or less than ΔPQ+a predetermined value (margin) (S423; YES), the pressure in the recirculation section falls below the target pressure P10A, and therefore purging is prohibited (S424). On the other hand, when the differential pressure between the pressure in the recirculation section and the target pressure P10A exceeds ΔPQ+the predetermined value (margin) (S423; NO), the pressure in the recirculation section does not fall below the target pressure P10A when the fuel gas is purged, and therefore purging is permitted (S425).

When the purge determination in each section is complete, the control section 50 determines a power generation amount of the fuel cell 20 for consuming the fuel gas amounts determined in S403, S409, and S415 by referring to a hydrogen consumption amount-fuel cell power generation amount map (S426). Then, referring to the fuel cell power generation amount-air stoichiometric map, the control section 50 adjusts the rotation speed of the motor M1 such that the oxidizing gas required for obtaining the desired power generation amount is supplied to the fuel cell 20 (S427). Then, when the hydrogen supply valve H200 is open (S428; YES), the control section 50 adjusts the rotation speed of the motor M2 such that fuel gas is supplied to the fuel cell 20 at a flow rate required for obtaining the desired power generation amount by referring to the fuel cell power generation amount-hydrogen stoichiometric map (S429). Then, referring to the fuel cell power generation amount-purging frequency map, the control section 50 performs open/close control on the purge valve H51 (S430). If purging is prohibited at this time (S406, S412, S418, S424), the purge valve H51 is maintained in a closed state. On the other hand, when the hydrogen supply valve H200 is closed (S428; NO), the control section 50 halts the hydrogen pump 63 (S431) and performs open/close control on the purge valve H51 by referring to the fuel cell power generation amount-purging frequency map (S432). While opening and closing the purge valve H51, the control section 50 calculates the purge amount purged each time by the purge valve H51 on the basis of a primary pressure, a secondary pressure, and an open time thereof (S433). Here, the primary pressure of the purge valve H51 may be determined from the pressure value detected by the pressure sensor P11. The secondary pressure of the purge valve H51 may be determined from the flow rate of the oxygen off-gas flowing through the cathode off-gas flow passage 42.

When the SOC of the secondary battery 54 is equal to or greater than a predetermined value (for example, between 80% and 90%) (S434; YES), the power that is generated through consumption of the fuel gas cannot be charged to the secondary battery 54, and therefore the control section 50 reduces the power generation amount of the fuel cell 20 and increases the fuel gas purge amount (S435). Further, when the fuel gas purging frequency increases beyond a predetermined frequency (S436; YES), the concentration of the fuel gas that is discharged to the outside of the system increases, and therefore, to reduce the discharged fuel gas concentration, the control section 50 increases the rotation speed of the air compressor 40 to increase the flow rate of the oxygen off-gas flowing through the cathode off-gas flow passage 42, thereby reducing the concentration of the discharged fuel gas that is diluted by the diluter 64 (S437). In other words, the cathode off-gas (oxidizing gas) introduced into the diluter 64 is increased by increasing the amount of oxidizing gas supplied to the cathode of the fuel cell 20 in accordance with the increase in the fuel gas purge amount (the increase in the discharged fuel gas concentration). As a result, the concentration of the purged fuel gas can be diluted. Note that the purge gas may be oxidized by a burner having a catalyst instead of the diluter 64.

By consuming the fuel gas associated with power generation and executing a fuel gas purge operation in this manner (S426 to S437), the pressure in each section (gas leak-detection portion) of the fuel gas supply system can be reduced rapidly. More specifically, the pressure in the high pressure section, low pressure section, and FC section can be reduced through consumption of the fuel gas associated with power generation and the fuel gas purge operation, while the pressure in the recirculation section can be reduced by the fuel gas purge operation. The gas leak determination in each section is preferably performed by closing each of the valves provided in the fuel gas supply system to form a closed space (substantially sealed space), and detecting the pressure decrease margin in the closed space, for example. The gas leak determination is preferably performed after a time required to close the valves and a time required to stabilize the pressure in the substantially sealed space have elapsed. In so doing, a gas leak can be detected with a high degree of precision.

When the detected pressure of the pressure sensor P6 is equal to or less than the target pressure P6A (S438; YES), this indicates that the pressure in the high pressure section has reached a favorable pressure for determining a gas leak, and therefore the control section 50 closes the hydrogen supply valve H200 (S439). In so doing, the high pressure section is set in a sealed state. Next, a determination is made as to whether or not the detected pressure of the pressure sensor P61 disposed on the downstream side of the hydrogen supply valve H200 has fallen to or below a predetermined pressure PJA1 (S440). The predetermined pressure PJA1 is a pressure for determining whether or not the hydrogen supply valve H200 is definitely closed. When the detected pressure of the pressure sensor P61 is equal to or lower than the predetermined pressure PJA1 (S440; YES), a determination is made as to whether or not a predetermined time t3 has elapsed after closing the hydrogen supply valve H200 (S441) so that a gas leak determination can be performed in the high pressure section. When the predetermined time t3 has elapsed (S441; YES), the detected pressure of the pressure sensor P6 is stored as P6P (S442). A determination is then made as to whether or not a predetermined time t4 has elapsed after closing the hydrogen supply valve H200 (S443), and when the predetermined time t4 has elapsed (S443; YES), a differential pressure (pressure decrease margin) ΔP6 between the stored pressure P6P and the detected pressure of the pressure sensor P6 is calculated (S444). Here, when the differential pressure ΔP6 is equal to or greater than a predetermined threshold pressure Pj15 (S445; YES), it is determined that a gas leak has occurred in the high pressure section (S446). Possible causes of the gas leak include an opening defect in the tank valve H201 or hydrogen supply valve H22, or a breakage in the regulators H9, H10 or the fuel gas supply passage 31. Here, an opening defect indicates a defective state in which the valve remains open and cannot be closed.

On the other hand, when the predetermined time t3 has not elapsed after closing the hydrogen supply valve H200 (S441; NO), or the predetermined time t4 has not elapsed after closing the hydrogen supply valve H200 (S443; NO), or the differential pressure ΔP6 is lower than the predetermined threshold pressure Pj15 (S445; NO), the control section 50 allows a gas leak determination in the low pressure section (S447). The reason for this is that even when the predetermined time t3 or t4 after the closing of the hydrogen supply valve H200 has not elapsed, as long as the hydrogen supply valve H200 is already closed, a gas leak determination can be performed in the low pressure section in parallel with the gas leak determination in the high pressure section.

When the detected pressure of the pressure sensor P61 falls to or below the target pressure P61A (S448; YES), this indicates that the pressure in the low pressure section has reached a favorable pressure for determining a gas leak, and therefore the control section 50 closes the FC stack inlet valve H21 (S449). In so doing, the low pressure section is set in a sealed state. Next, a determination is made as to whether or not the detected pressures of the pressure sensors P5, P11 disposed on the downstream side of the FC stack inlet valve H21 have fallen to or below predetermined pressures PJA2, PJA3, respectively (S450). The predetermined pressures PJA2, PJA3 are pressures for determining whether or not the FC stack inlet valve H21 is definitely closed. When the detected pressures of the pressure sensors P5, P11 are respectively equal to or lower than the predetermined pressures PJA2, PJA3 (S450; YES), a determination is made as to whether or not a predetermined time t5 has elapsed after closing the FC stack inlet valve H21 (S451) so that a gas leak determination can be performed in the low pressure section. When the predetermined time t5 has elapsed (S451; YES), the detected pressure of the pressure sensor P61 is stored as P61P (S452). A determination is then made as to whether or not a predetermined time t6 has elapsed after closing the FC stack inlet valve H21 (S453), and when the predetermined time t6 has elapsed (S453; YES), a differential pressure (pressure decrease margin) ΔP61 between the stored pressure P61P and the detected pressure of the pressure sensor P61 is calculated (S454). Here, when the differential pressure ΔP61 is equal to or greater than a predetermined threshold pressure Pj16 (S455; YES), it is determined that a gas leak has occurred in the low pressure section (S456). Possible causes of the gas leak include an opening defect in the hydrogen supply valve H22 or the FC stack inlet valve H21, or a breakage in the fuel gas supply passage 31 or the fuel gas recirculation passage 32.

On the other hand, when the predetermined time t5 has not elapsed after closing the FC stack inlet valve H21 (S451; NO), or the predetermined time t6 has not elapsed after closing the FC stack inlet valve H21 (S453; NO), or the differential pressure ΔP61 is lower than the predetermined threshold pressure Pj16 (S455; NO), the control section 50 allows a gas leak determination in the FC section (S457). The reason for this is that even when the predetermined time t5 or t6 after the closing of the FC stack inlet valve H21 has not elapsed, as long as the FC stack inlet valve H21 is already closed, a gas leak determination can be performed in the FC section in parallel with the gas leak determination in the low pressure section.

When the detected pressure of the pressure sensor P5 falls to or below the target pressure P5A (S458; YES), this indicates that the pressure in the FC section has reached a favorable pressure for determining a gas leak, and therefore the control section 50 closes the FC stack outlet valve H22 (S459). In so doing, the FC section is set in a sealed state. Next, a determination is made as to whether or not the detected pressure of the pressure sensor P10 disposed on the downstream side of the FC stack outlet valve H22 has fallen to or below a predetermined pressure PJA4 (S460). The predetermined pressure PJA4 is a pressure for determining whether or not the FC stack outlet valve H22 is definitely closed. When the detected pressure of the pressure sensor P10 is equal to or lower than the predetermined pressure PJA4 (S460; YES), a determination is made as to whether or not a predetermined time t7 has elapsed after closing the FC stack outlet valve H22 (S461) so that a gas leak determination can be performed in the FC section. When the predetermined time t7 has elapsed (S461; YES), the detected pressure of the pressure sensor P5 is stored as P5P (S462). A determination is then made as to whether or not a predetermined time t8 has elapsed after closing the FC stack outlet valve H22 (S463), and when the predetermined time t8 has elapsed (S463; YES), a differential pressure (pressure decrease margin) ΔP5 between the stored pressure P5P and the detected pressure of the pressure sensor P5 is calculated (S464). Here, when the differential pressure ΔP5 is equal to or greater than a predetermined threshold pressure Pj17 (S465; YES), it is determined that a gas leak has occurred in the FC section (S466). Possible causes of the gas leak include an opening defect in the FC stack inlet valve H21 or FC stack outlet valve H22, or a breakage in the fuel gas supply passage 31 or fuel gas recirculation passage 32.

On the other hand, when the predetermined time t7 has not elapsed after closing the FC stack outlet valve H22 (S461; NO), or the predetermined time t8 has not elapsed after closing the FC stack outlet valve H22 (S463; NO), or the differential pressure ΔP5 is lower than the predetermined threshold pressure Pj17 (S465; NO), the control section 50 allows a gas leak determination in the recirculation section (S467). The reason for this is that even when the predetermined time t7 or t8 after the closing of the FC stack outlet valve H22 has not elapsed, as long as the FC stack outlet valve H22 is already closed, a gas leak determination can be performed in the recirculation section in parallel with the gas leak determination in the FC section.

When the detected pressure of the pressure sensor P10 falls to or below the target pressure P10A (S468; YES), this indicates that the pressure in the recirculation section has reached a favorable pressure for determining a gas leak, and therefore the control section 50 prohibits opening and closing of the purge valve H51 (S469). In so doing, the recirculation section is set in a sealed state. To perform a gas leak determination in the recirculation section, the control section 50 determines whether or not a predetermined time t9 has elapsed after prohibiting opening and closing of the purge valve H51 (or after closing the FC stack outlet valve H22) (S470). When the predetermined time t9 has elapsed (S470; YES), the detected pressure of the pressure sensor P10 is stored as P10P (S471). A determination is then made as to whether or not a predetermined time t10 has elapsed after prohibiting opening and closing of the purge valve H51 (or after closing the FC stack outlet valve H22) (S472), and when the predetermined time t10 has elapsed (S472; YES), a differential pressure (pressure decrease margin) ΔP10 between the stored pressure P10P and the detected pressure of the pressure sensor P10 is calculated (S473). Here, when the differential pressure ΔP10 is equal to or greater than a predetermined threshold pressure Pj18 (S474; YES), it is determined that a gas leak has occurred in the recirculation section (S475). Possible causes of the gas leak include an opening defect in the FC stack outlet valve H22 or check valve H52, or a breakage in the fuel gas recirculation passage 32. On the other hand, when the differential pressure ΔP10 is lower than the predetermined threshold pressure Pj18 (S474; NO), it is determined that a gas leak has not occurred in the recirculation section, and the gas leak determination is terminated (S476).

Figure 11:
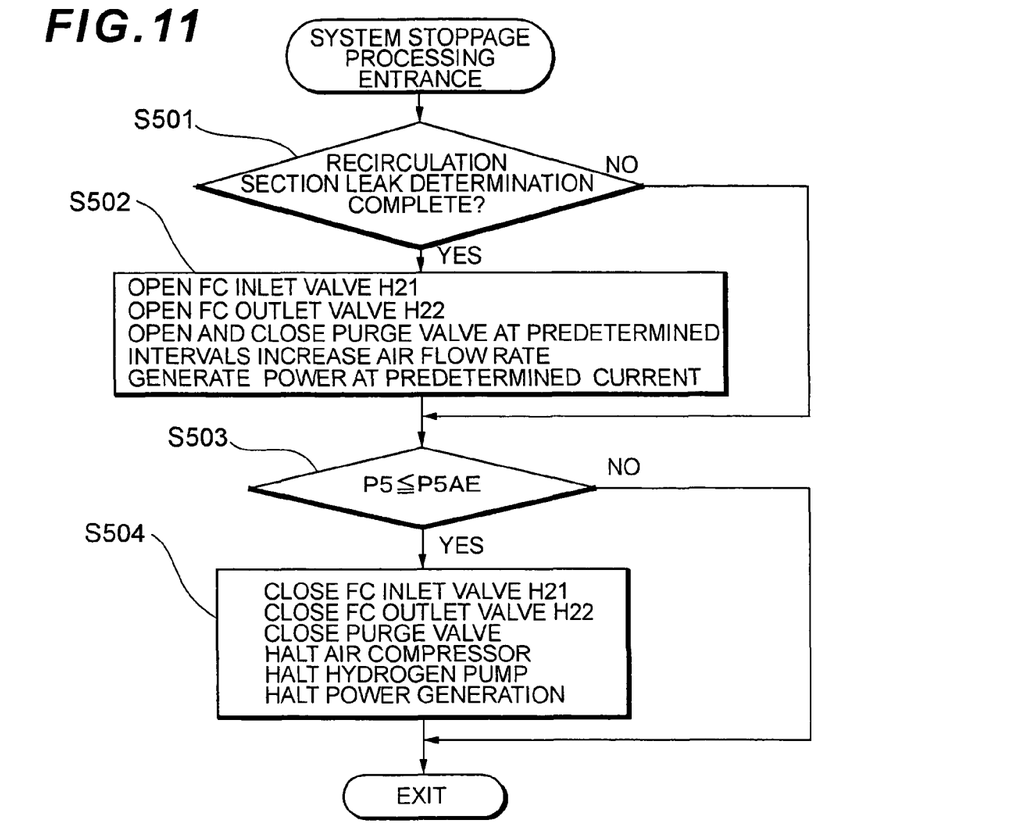
FIG. 11 is a system stoppage processing routine.

FIG. 11 is a flowchart illustrating the system stoppage processing routine (S109). When this routine is called, the control section 50 determines whether or not the gas leak determination in the recirculation section is complete (S501). When the gas leak determination in the recirculation section is complete (S501; YES), the control section 50 opens the FC stack inlet valve H21 and FC stack outlet valve H22 such that the remaining fuel gas in the fuel gas supply passage 31 and fuel gas recirculation passage 32 is led to the fuel cell 20 (S502). Simultaneously, the control section 50 rotates the air compressor 40 to supply oxidizing gas to the fuel cell 20. The fuel gas introduced into the fuel cell 20 is consumed by power generation. Further, the control section 50 purges the fuel gas by opening the purge valve H51 at appropriate time intervals, thereby reducing the impurity concentration of the fuel gas circulating through the fuel cell 20. A determination is then made as to whether or not the detected pressure of the pressure sensor P5 has fallen to or below a target pressure P5AE (S503). A pressure at which the fuel gas does not cross-leak to the cathode side during a system stoppage is preferably used as the target pressure P5AE. When the detected pressure of the pressure sensor P5 has fallen to or below the target pressure P5AE (S503; YES), the control section 50 closes the FC stack inlet valve H21, FC stack outlet valve H22, and purge valve H51, and halts the air compressor 40 and hydrogen pump 63 to halt power generation (S504).

Figure 12:
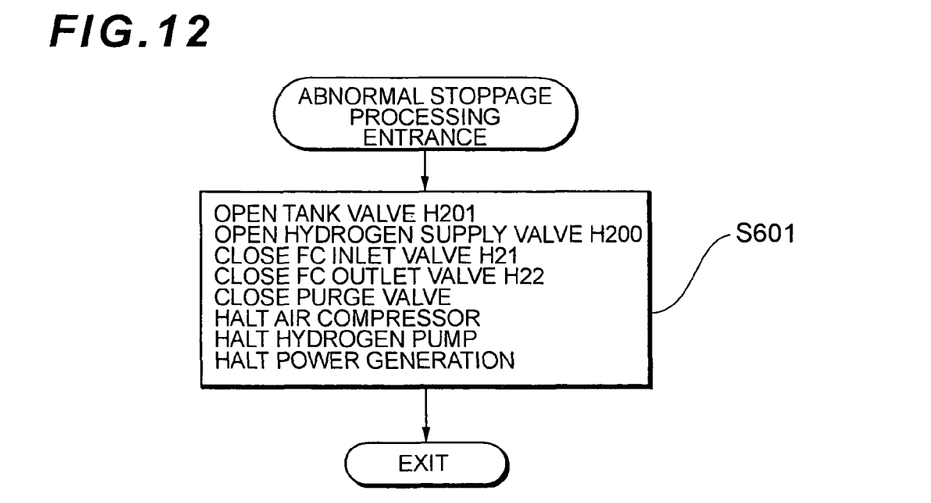
FIG. 12 is an abnormal stoppage processing routine.

FIG. 12 is a flowchart illustrating the abnormal stoppage processing routine (S111). When it is determined that a gas leak has occurred (S210, S446, S456, S446, S475) in the gas leak determinations described above (S102, S106, S108), the abnormal stoppage processing routine is called. When this routine is called, the control section 50 closes all of the valves provided in the fuel gas supply system, i.e. the tank valve H201, hydrogen supply valve H200, FC stack inlet valve H21, FC stack outlet valve H22, and purge valve H51, and also halts the air compressor 40 and hydrogen pump 63 such that power generation is halted (S601).

According to this embodiment, the pressure in a gas leak detection portion can be brought close to a target pressure in a short period of time not only by consuming the fuel gas present at the gas leak detection portion through power generation, but also by purging the fuel gas to the outside of the fuel gas supply passage, and therefore a gas leak determination can be performed in a short period of time and with a high level of precision. Moreover, by purging the fuel gas, increases in the impurity concentration of the fuel gas can be suppressed, and as a result, decreases in cell voltage can be suppressed.

According to the present invention, the pressure in a gas leak detection portion can be brought close to a target pressure in a short period of time not only by consuming the fuel gas present at the gas leak detection portion through power generation, but also by purging the fuel gas to the outside of the fuel gas supply passage, and therefore a gas leak determination can be performed in a short period of time and with a high level of precision. Moreover, by purging the fuel gas, increases in the impurity concentration of the fuel gas can be suppressed, and as a result, decreases in cell voltage can be suppressed. Hence, the present invention may be used widely in a fuel cell system having such requirements and as a gas leak determination method for the fuel cell system.

I claim:

1. A fuel cell system comprising:
a determination device configured to consume a fuel gas present at a gas leak detection portion of a fuel gas supply system at an anode of a fuel cell, and to perform a gas leak determination on the basis of a pressure variation state of the fuel gas present at the gas leak detection portion;
a discharge device configured to reduce a pressure at the gas leak detection portion by purging fuel gas present at an anode off-gas flow passage to the outside of the fuel gas supply system before performing the gas leak determination; and
a purge control device for controlling the discharge device,
wherein the purge control device is programmed to control the discharge device so as to perform purging when a differential pressure between a detection pressure at the gas leak detection portion and a target pressure is greater than a predetermined value, and
wherein the determination device is programmed to perform a gas leak determination when the detected pressure at the gas leak detection portion is equal to or smaller than the target pressure.

2. The fuel cell system according to claim 1, wherein the purge control device is programmed to control the discharge device so as to restrict purging when the pressure at the gas leak detection portion falls below the target pressure due to purging of the fuel gas.

3. The fuel cell system according to claim 1, wherein the purge control device is programmed to control the discharge device so as to vary a purge amount of the fuel gas present at the anode off-gas flow passage in accordance with a consumption amount of the fuel gas present at the anode of the fuel cell.

4. The fuel cell system according to claim 1, further comprising a generated current control device configured to control a generated current of the fuel cell in accordance with a consumption amount of the fuel gas present at the anode of the fuel cell.

5. The fuel cell system according to claim 1, further comprising a storage device configured to store power generated by the fuel cell,
wherein the purge control device is programmed to control the discharge device so as to vary a purge amount in accordance with a charge amount of the storage device.

6. The fuel cell system according to claim 1, further comprising:
a diluter for mixing and diluting a cathode off-gas discharged from the fuel cell and the fuel gas purged by the discharge device; and
an oxidizing gas supply amount control device configured to control a supply amount of an oxidizing gas to be supplied to a cathode of the fuel cell in accordance with a purge amount of the fuel gas purged from the discharge device.

7. The fuel cell system according to claim 1, further comprising a fuel gas sensor configured to detect a fuel gas leak,
wherein a fuel gas purge amount purged each time from the discharge device is within a leak detection threshold range of the fuel gas sensor.

8. The fuel cell system according to claim 1, wherein the gas leak detection portion is a substantially sealed space formed by closing a valve disposed in the fuel gas supply system, and the determination device is programmed to perform the gas leak determination after the valve is closed and a time required to stabilize the pressure in the substantially sealed space has elapsed.

9. The fuel cell system according to claim 1, wherein the discharge device includes a purge valve disposed in the anode off-gas flow passage for discharging hydrogen off-gas discharged from the fuel cell to the outside of the system.

10. The fuel cell system according to claim 1, wherein the determination device is programmed to control an open time of the discharge device; and the predetermined value is based on a ratio between an amount of the fuel gas purged during the open time of the discharge device and a volume of fuel gas in the gas leak detection portion, the amount of the fuel gas purged during the open time being calculated based on a primary pressure of the discharge device, a secondary pressure of the discharge device, and a duration of the open time.

11. The fuel cell system according to claim 10, further comprising a fuel gas sensor configured to detect a fuel gas leak, wherein the determination device is programmed to control the open time of the discharge device such that the amount of the fuel gas purged during the open time is within a leak detection threshold range of the fuel gas sensor.

12. The fuel cell system according to claim 11, wherein the open time is a plurality of open times, and each of the plurality of open times is within the leak detection threshold range of the fuel gas sensor.

* * * * *